United States Patent [19]
Gange et al.
[11] Patent Number: 4,520,754
[45] Date of Patent: Jun. 4, 1985

[54] PROCESS AND APPARATUS FOR ELECTROSTATIC APPLICATION OF LIQUIDS OR POWDERS ON SUBSTANCES OR OBJECTS

[75] Inventors: Lester Gange, 25, Bellevue La., Bushey Heath, Hertfordshire; Reginald J. H. Pannell, 44 Tudor Ave., Worcester Park, Surrey, both of England

[73] Assignees: Lester Gange, Bushey Heath; Reginald James Harding Pannell, Worcester Park, both of England; E.D.T. Electrostatic Deposition Technologies S.p.A., Milan, Italy

[21] Appl. No.: 449,654

[22] Filed: Dec. 14, 1982

[30] Foreign Application Priority Data

Feb. 2, 1982 [IT] Italy .............................. 19402 A/82

[51] Int. Cl.³ .......................... B05B 5/02; B05D 1/04
[52] U.S. Cl. .................................. 118/626; 118/303; 118/627; 118/630; 118/638; 427/28; 427/31; 427/33; 427/32
[58] Field of Search ....................... 427/28, 31, 33, 32, 427/420; 118/303, 626, 638, 627, 630

[56] References Cited

U.S. PATENT DOCUMENTS

| | | | |
|---|---|---|---|
| 1,855,869 | 4/1932 | Pugh | 427/33 |
| 3,000,574 | 9/1961 | Sedlacsik, Jr. | 118/626 |
| 3,001,890 | 9/1961 | Sedlacsik, Jr. | 427/31 |
| 4,116,163 | 9/1978 | Torelli et al. | 118/303 |
| 4,209,550 | 6/1980 | Hagenbach et al. | 427/27 |
| 4,324,198 | 4/1982 | Muz | 118/630 |

*Primary Examiner*—Thurman K. Page
*Attorney, Agent, or Firm*—McAulay, Fields, Fisher, Goldstein & Nissen

[57] ABSTRACT

The present invention relates to a process and an apparatus for electrostatic application of liquids or powders on many different substances and objects, by means of a cone diffusing the substances or objects to be coated, in free fall continuously along the internal wall of a tube where a high voltage positive corona zone is produced, while the liquid or powder is prayed from a centrifugal atomizer, by which a high voltage negative corona zone is produced, so that the liquid or powder is charged negatively and is attracted by the substances or objects charged positively and sliding on the wall of the tube.

9 Claims, 1 Drawing Figure

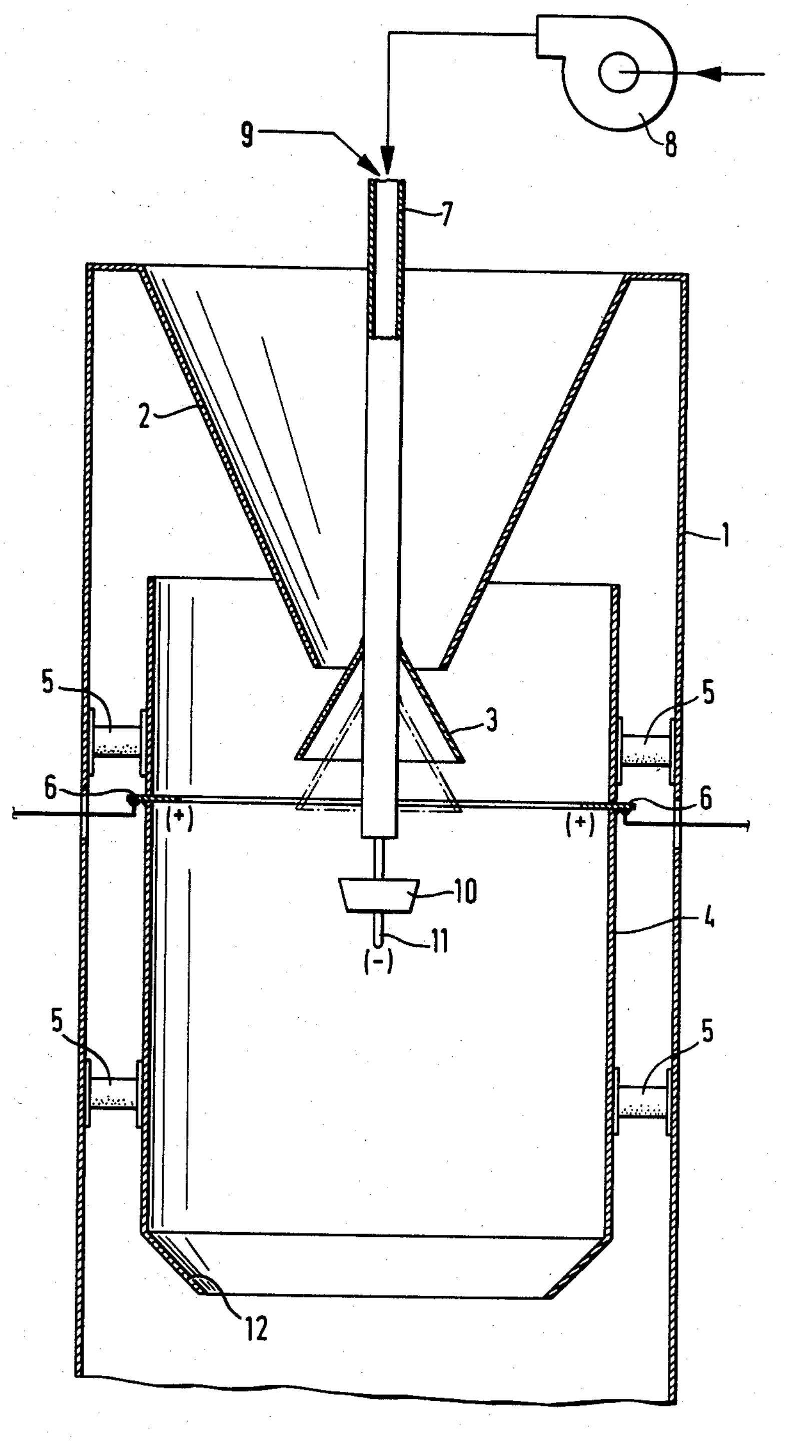
9
7
8
2
1
5
5
3
6
6
(+)
(+)
10
4
11
(-)
5
5
12

PROCESS AND APPARATUS FOR ELECTROSTATIC APPLICATION OF LIQUIDS OR POWDERS ON SUBSTANCES OR OBJECTS

BACKGROUND OF THE INVENTION

The present invention relates to a process and an apparatus for the electrostatic application of liquids or powders on many different substances, particles and objects, with truly excellent results which cannot be obtained in any way with the presently known processes.

The invention uses the well established principle of the electrostatic attraction between materials, whether liquid or solid, when they receive high electrical charges of opposite sign. Electrostatic charge effects have been used for a number of years in the application of paint to metal objects of a considerable size, such as washing machines, refrigerators, motorcars, or in photocopying machines.

With the process and the apparatus of the present invention it is possible to apply liquid or powder coating on many different non metallic natural, artificial or synthetic materials, such as powders, pellets, tablets, seeds, grain and similar particles and substances or even objects and material of small individual size.

SUMMARY OF THE INVENTION

The process according to the present invention is characterized by the fact of comprising the steps of producing a substantially continuous circular curtain of the product to be coated, causing it to pass on a stationary diffusion means, then giving it a high positive electrical charge by passing it through a positive corona zone, whilst in free fall; diffusing the coating liquid or powder through a centrifugal diffuser means where it is given a high negative electrical charge by passing it through a similar but negative corona zone, so that the particles of the product to be coated whilst in free fall, are totally and uniformly envelopped by the liquid or powder coating particles, which are attracted thereto because of the opposite sign of their charges.

The apparatus according to the present invention is characterized by the fact of comprising a feeding device for the product to be coated, having at its end a stationary diffusion device producing a substantially continuous circular curtain of said product whilst in free fall on the walls of a non conductive tube, where a high voltage positive electrode is placed, producing a positive corona zone, positively charging the particles of the producto be coated; a central feeding duct for the liquid or powder coating particles, having at its end a centrifugal diffuser member provided with a high voltage negative electrode, producing a negative corona zone, negatively charging the particles of the liquid or powder coating; so that the particles of the product whilst in free fall, are totally and uniformly evenlopped by the liquid or powder coating particles, which are attracted thereto because of the opposite sign of their charges.

When the product is to be coated with a liquid, the centrifugal diffuser device is a centrifugal atomiser fed by a micro pump or similar calibrated, accurate and controlled feeding device for the spray liquid.

If it is required to coat the product with a powder then the liquid centrifugal atomiser is replaced by either a powder gun fed from a fluidiser or similar powder system having a 360° diffuser horn, or cone shape fitted concentrically to the powder flow, or again using the centrifugal atomiser, but with the liquid feed system replaced by a suitable powder projection system.

The throat of the stationary diffusion device for the product to be coated may be adjusted to regulate the quantity of product to be diffused in free fall.

It is also possible to charge the powder with a friction processing device (frictional electricity) or by an electro gas dynamics system.

The process and the apparatus according to the present invention have the following considerable advantages over conventional coating methods:

(1) The product to be coated does not need to be earthed, therefore non conductive materials can be used.

(2) Since coating takes place in free fall it is possible to produce more continuous films than by other systems, and practically uniform and total coatings.

(3) By using a curtain of product totally surrounding the delivery head for the coating liquid of powder, losses of such a spray liquid or powder are totally eliminated.

(4) Unlike ordinary centrifugal coaters, this system of counter charging produces mutual directional attraction between the product to be coated and the coating spray. This then eliminates variations caused by discontinuity in the circular product curtain and is instrumental in eliminating normal coating spray losses, which can otherwise occur.

(5) The operation of the plant is absolutely continuous and by linking the feed pump control for the coating spray to the product flow by means of a computer unit, a constant ratio of coating spray to product can be maintained.

This is most important in the addition of vitamins and antibiotics and in the addition of Amines to Ammonium Nitrate fertiliser pellets, which are explosive above 0.7%.

(6) The electrical energy consumption is less than 200 Watts for a throughput of 200 Kgs per Minute, and therefore the system of the invention is very cost effective compared with conventional rublers and drum coaters using up to 50 Horse Power for similar outputs.

BRIEF DESCRIPTION OF THE DRAWING

Objects, features and advantages of the invention will be apparent and clear from the following description of an embodiment of the apparatus according to the present invention, which is given as a non limiting example only and with reference to the accompanying illustrative drawings, whose single FIGURE shows said apparatus in a rather diagrammatic form.

DETAILED DESCRIPTION OF THE PREFERRED EMBODIMENT

With reference now to said single FIGURE of the accompanying drawing, the apparatus according to the present invention substantially comprises an outer frame 1, at the top center of which a hopper 2 for the product to be coated is fixed, said product being deviated and diffused at its bottom by a stationary diffusion cone 3 so as to produce a continuous curtain of free falling product along the walls of the internal non conductive tube 4, fixed to the outer frame 1 by insulators 5. On the internal tube 4 a high voltage positive electrode 6 is arranged, producing a positive corona zone, giving to the particles of the product to be coated a high positive charge up to 90–100 kV. The polarity of the electrodes 6 and 11 may also be inverted.

At the center of the apparatus, the axis on which the stationary diffusion cone 3 is mounted, consists of a pipe 7 for feeding the coating liquid or powder, coming from a feeding pump 8, said pipe 7 being also provided with the negative power line 9. The lower end of pipe 7 is formed by the rotary atomizer head 10, spraying the liquid or powder on the curtain of product to be coated, whilst in free fall along the wall of the internal tube 4. Atomizer 10 is also provided with the high voltage negative electrode 11, producing a negative corona zone, giving to the coating liquid or powder a high negative charge, also up to 90–100 kV.

It is therefore clear that the particles of coating liquid or powder, negatively charged are attracted by the positively charged product and coat it totally and without any waste, the so coated finished product being discharged by the bottom mouth 12 of the internal tube 4 on a suitable carrying and/or discharging device (not shown), which could be for instance an endless conveyor belt or any other device, mainly designed according to the kind of product to be processed.

The width of the throat or nozzle for the diffusion of the product to be coated, formed by the distance between the lower end of the hopper 2 and the wall of the stationary diffusion cone 3, may be adjusted in order to change the flow rate of product to be coated which is introduced into the processing chamber, said adjustment being diagrammatically shown in dotted lines on the drawing.

As merely illustrative and non limiting examples only, the process and the apparatus according to the present invention have been proved by the following successful experiments:

(a) The addition of 0.2% of oil containing vitamins to skim milk powder at the rate of 1.5 Tonnes/Hour. Analysis on 2 gm samples showed less than 0.5% variation in vitamin content.

(b) The addition of 2 Kgs per Tonne of Amine Solution to Ammonium Nitrate Fertiliser pellets of 1–2 mm diameter at the rate of 200 Kgs/Minute.

(c) The addition of Antifungicides and Bird Repellents to seeds producing a 30% improvement in film continuity over Non-Electrostatic Free Fall systems.

(d) The addition of up to 5% fat with or without the further inclusion of antibiotics and vitamins to pig weaner pellets at a rate of 1 Tonne/Hour.

(e) Addition of flavours such as Peppermint Oil and Organge Oil to sugar and to compressed sugar confectionary.

(f) The addition of wetting agents to very fine powders of bulk density of 0.3 Kgs/Liter as a first step in the formation of slurries.

From the foregoing it is therefore clear the great versatility of the process and the apparatus according to the present invention and the exceptional quality of the coated products so obtained, and it is to be understood that many variations, modifications, additions and/or substitutions of elements may be resorted thereto, without alterating however its spirit nor departing from its scope of protection, as it is defined in the appended claims.

We claim:

1. A method for the electrostatic coating of objects with a liquid or powder material comprising the steps of:

(a) producing a substantially continuous free-falling circular curtain of the objects to be coated;

(b) charging said objects with a high electrical charge of a first polarity by passing said objects through a first corona discharge zone while said objects are in free-fall;

(c) diffusing said coating material by passing it through a centrifugal diffusing device and directing said coating material toward said curtain of objects to be coated; and (d) charging said coating material with a high electrical charge of a second polarity opposite to said first polarity by passing said material through a second corona discharge zone, whereby said coating material is electrostatically attracted to said objects to totally and uniformly coat said objects.

2. Process according to claim 1, characterized by the fact that a constant ratio between said objects to be coated and said coating material is maintained by an electronic control regulating the feed of coating material as a function of the flow of said objects.

3. Apparatus for the electrostatic coating of products with a liquid or powder material comprising a feeding means for introducing the product to be coated, a non-conductive tube comprising a wall surrounding the end of said feeding means, said feeding means having first diffusion means at the end thereof for producing a substantially continuous free-falling circular curtain of the product against the walls of said tube, a high voltage electrode adjacent the wall of said tube for producing a corona discharge zone of a first polarity to charge the product with said first polarity, a central duct extending into said tube for introducing the coating material therein, second centrifugal diffusion means at the end of said duct for diffusing outwardly the coating material, a high voltage electrode adjacent said second diffusion means for producing a corona discharge zone of a second polarity opposite to said first polarity to charge the material with said second polarity, whereby the coating material is electrostatically attracted to the product to coat the product.

4. Apparatus according to claim 3, characterized by the fact that, when the product is to be coated with a liquid, the second centrifugal diffusion means is a centrifugal atomiser fed by a micro pump or similar calibrated, accurate and controlled feeding device for the spray liquid.

5. Apparatus according to claim 3, characterized by the fact that, when the product is to be coated with a powder, the second centrifugal diffusion means, is a powder gun fed from a fluidiser or similar powder feeding system having a 360° diffuser horn.

6. Apparatus according to claim 3, characterized by the fact that, when the product is to be coated with a powder, the second centrifugal diffusion means is a cone shape fitted concentrically to the powder flow.

7. Apparatus according to claim 3, characterized by the fact that, when the product is to be coated with a powder, the second centrifugal diffusion means is a centrifugal atomiser provided with a suitable powder projection system.

8. Apparatus according to any one of claims 3–7, characterized by the fact that the throat of the first diffusion means for the product to be coated may be adjusted to regulate the quantity of product to be diffused in free fall.

9. Apparatus according to any one of claims 5 through 7, characterized by the fact that the powder is electrically charged by a friction processing device or by an electro gas dynamics system.

* * * * *